United States Patent
Petrovski et al.

(10) Patent No.: US 7,340,343 B2
(45) Date of Patent: Mar. 4, 2008

(54) RTK POSITIONING SYSTEM AND POSITIONING METHOD THEREFOR

(75) Inventors: Ivan G. Petrovski, Tokyo (JP); Hideyuki Torimoto, Tokyo (JP)

(73) Assignees: Funai Electric Co., Ltd., Daito-shi, Osaka (JP); GNSS Technologies Inc., Tokyo (JP)

( * ) Notice: Subject to any disclaimer, the term of this patent is extended or adjusted under 35 U.S.C. 154(b) by 708 days.

(21) Appl. No.: 10/936,452

(22) Filed: Sep. 8, 2004

(65) Prior Publication Data

US 2005/0080563 A1    Apr. 14, 2005

(30) Foreign Application Priority Data

Sep. 8, 2003    (JP) ............... P.2003-316003

(51) Int. Cl.
  *G01C 21/00*  (2006.01)
  *G01S 1/00*   (2006.01)

(52) U.S. Cl. .............. 701/213; 701/215; 342/463; 342/357.06

(58) Field of Classification Search .......... 701/200, 701/213–215; 342/463–465; 340/988
See application file for complete search history.

(56) References Cited

U.S. PATENT DOCUMENTS

| | | | | |
|---|---|---|---|---|
| 5,177,489 A | * | 1/1993 | Hatch | 342/357.04 |
| 5,936,573 A | * | 8/1999 | Smith | 701/213 |
| 5,983,161 A | * | 11/1999 | Lemelson et al. | 701/301 |
| 6,469,663 B1 | * | 10/2002 | Whitehead et al. | 342/357.03 |
| 6,762,714 B2 | * | 7/2004 | Cohen et al. | 342/357.12 |
| 2002/0057217 A1 | * | 5/2002 | Milnes et al. | 342/357.07 |

FOREIGN PATENT DOCUMENTS

JP    2003-215228    7/2003

* cited by examiner

*Primary Examiner*—Yonel Beaulieu
(74) *Attorney, Agent, or Firm*—Osha Liang LLP

(57) ABSTRACT

The locations of pseudolites and the location of a stationary reference station are previously known by a user processing unit, and codes and carrier phase of signals transmitted from the pseudolites are measured by the stationary reference station, a moving reference station and a rover receiver. Data of the codes and the carrier phase measured by the stationary reference station, the moving reference station and the rover receiver are transmitted to the user processing unit using a data link. The user processing unit determines a baseline between the stationary reference station and the moving reference station, and a baseline between the moving reference station and the rover receiver. The two baselines and the previously known location of the stationary reference station are employed to determine the position of the rover receiver.

40 Claims, 2 Drawing Sheets

RTK POSITIONING SYSTEM AND POSITIONING METHOD THEREFOR

BACKGROUND OF THE INVENTION

1. Field of the Invention

The present invention relates to a real time kinematic (hereinafter referred to as RTK) positioning system and an RTK positioning method therefor, and particularly to an accurate RTK positioning system that employs a pseudolite using carrier phase.

2. Description of the Related Art

Many positioning methods are available for using artificial satellites (hereinafter referred to simply as "satellites"), but currently, the most generally used positioning method is one employing a GPS satellite. Various positioning methods are also available for using the GPS; of these, a positioning method using carrier phase is superior because of its high accuracy, i.e., errors of only several mm to several cm, and the short positioning period it requires. For a positioning method that employs carrier phase, wave-number indeterminacies (hereinafter referred to as "ambiguities") in carrier phase data must be determined, and a method for determining ambiguities for the GPS is already well known, especially for real time application. A positioning method that uses carrier phase and that is employed for real time application is an RTK positioning method.

Disclosed is a method whereby a user can obtain a current location in real time, even in an environment, such as behind a building, indoors or in an underground area, where plotting the location is difficult. According to this method, the location of a portable terminal device incorporating a GPS reception function is displayed by using a representative character, and based on a positioning error, the velocity and the forwarding direction, which are obtained by analyzation using a GPS signal, a positioning error circle and arrows indicating velocity and forward direction are displayed, with the character located in the center. Instead of using the current location, the positioning error, the velocity and the forward direction, a display terminal device incorporating a GPS receiver, or a GPS receiving function, employs information, such as the past locations of the terminal device, an error value, the velocity and the forward direction, to display a predicted location, positioning error, velocity and forward direction.

JP-A-2003-215228 is referred to as a related art.

When a positioning method employing carrier phase is employed, a geometry change is required that is determined in accordance with the positions of a signal source, the rover receiver of a user and the receiver of a reference station. The geometry need only be changed for each measurement cycle (hereinafter referred to as "epoch"). The geometry change is a condition for determining an ambiguity, and when the positioning is performed outdoors, this condition is satisfied by the movement of the satellite.

Generally, as the initialization operation for a positioning method employing carrier phase, the determination of an ambiguity is performed. When the initialization operation is performed, the ambiguity is determined, and the initial location of a user is determined. Thereafter, while continuing to receive a signal from the satellite, the user moves from measurement point to measurement point, and a positioning is performed at each measurement point. According to the positioning method employing the carrier phase, it is important that a signal be continuously received not only at each measurement point, but also while the user is moving. However, because of external factors, such as the affect of wave transmission delay in the ionosphere or the troposphere, or a radio environment such as a multipath at a measurement point, an interrupt or a break in the reception of a signal from a satellite is not rare, and each time the signal reception is interrupted, the ambiguity determination operation must be repeated.

A big problem that affects not only RTK positioning but, in general, all satellite dependant positioning methods that employ satellites, is that in mountains and forests and among skyscrapers, and in tunnels and buildings and underground, so-called hidden locations, as viewed from a satellite, the reception of satellite signals is erratic or impossible. Therefore, sometimes either satellite signals cannot be received, or the number that are received is insufficient for positioning. In such a case, either positioning cannot be performed, or it cannot be performed correctly.

According to the method disclosed in JP-A-2003-215228, for a so-called hidden location, as viewed from a satellite, in mountains or a forest or among skyscrapers, or in a tunnel or a building or underground, for example, where positioning cannot be performed, past history, i.e., the history of positioning made in such a location, is employed to calculate a predicted route. Therefore, if positioning will start to perform with reference to an initial location where the positioning could not completed, no past history is available and positioning cannot be performed for that location.

For performing indoor positioning, the present inventors proposed one method. According to this method, for example, a pseudo satellite (hereinafter referred to as "pseudolite") is installed on the ground instead of a GPS satellite, and also one reference receiver is installed that is generally employed for RTK positioning. Then, the rover receiver of a user is calibrated by using a signal received from the pseudolite. However, using this method, since the pseudolite and the reference receiver are fixed, the change in the geometry does not occur. Therefore, the initial location of the rover receiver of the user cannot be determined, and an accurate carrier phase positioning function having an error of only several mm to several cm cannot be employed.

In order to use the positioning method employing the carrier phase, the present inventors moved one reference station receiver to change the geometry. However, according to the positioning method employing the carrier phase, the location of the reference receiver must be obtained before the ambiguity determination operation is begun, so that the method studied by the inventors is not a viable solution. Further, although an independent positioning method employing code is also available, this method is not appropriate, especially for accurate positioning indoors, because an error of at least several m occurs.

Since automatic, precise indoor positioning is required for the field of robotics, there is a demand for accurate positioning means that can also be employed for the robots.

The problem to be resolved is that, in places such as outdoors where a signal cannot be received from a satellite, and places geographically hidden from the satellite, such as those in cities or in mountains, where the number of signals required for positioning cannot be received from a satellite, the positioning method employing the carrier phase cannot be used, and accurate positioning is impossible. Specifically, the problem is that when a user does not have any advance information for a location, the user has no means for determining his or her location.

SUMMARY OF THE INVENTION

The invention provides an RTK (Real Time Kinematic) positioning system which determines positions with pseudolites substituting as GPS satellites, having: a plurality of pseudolites, each of which is located at a predetermined position; a rover receiver for measuring code and carrier phase of signals transmitted from each of the pseudolites; a stationary reference station located at a predetermined position and for measuring code and carrier phase of signals transmitted from each of the pseudolites; a moving reference station for measuring code and carrier phase of signals transmitted from each of the pseudolites, and for moving; a user processor unit for positioning the rover receiver based on code and carrier phase transmitted from the stationary reference station and the moving reference station respectively and code and carrier phase transmitted from the rover receiver; and a data link to transmit each data from the stationary reference station, the moving reference station and the rover receiver to the user processor unit, wherein a position of the stationary reference station and each position of the pseudolites are known by the user processor unit.

Furthermore, at least four pseudolites are used for three-dimensional positioning of the rover receiver, and at least three pseudolites are used for two-dimensional positioning of the rover receiver.

The invention also provides an RTK (Real Time Kinematic) positioning system which determines positions with a GPS satellite and a pseudolite, having: a GPS satellite; at least one pseudolite, each of which is located at a predetermined position; a rover receiver for measuring code and carrier phase of signals transmitted from each of the GPS satellite and the pseudolite; a stationary reference station located at a predetermined position and for measuring code and carrier phase of signals transmitted from each of the GPS satellite and the pseudolite; a moving reference station for measuring code and carrier phase of signals transmitted from each of the GPS satellite and the pseudolite, and for moving; a user processor unit for positioning the rover receiver based on code and carrier phase transmitted from the stationary reference station and the moving reference station respectively, and code and carrier phase transmitted from the rover receiver; and a data link to transmit each data from the stationary reference station, the moving reference station and the rover receiver to the user processor unit, wherein a position of the stationary reference station and positions of the pseudolite are known by the user processor unit.

Furthermore, at least four satellites including the GPS satellite and the pseudolite are used for three-dimensional positioning of the rover receiver, and at least three satellites including the GPS satellite and the pseudolite are used for two-dimensional positioning of the rover receiver.

The invention also provides an RTK positioning method, including the steps of: setting positions of pseudolites to be previously known by a user processor unit and setting a position of a stationary reference station to be known by the user processor unit; measuring code and carrier phase of signals transmitted from the pseudolites by the stationary reference station, a moving reference station and a rover receiver held by a user, respectively; transmitting code data and carrier phase data respectively measured in the stationary reference station, the moving reference station and the rover receiver to the user processor unit with a data link; positioning the rover receiver based on code and carrier phase transmitted from the stationary reference station, the moving reference station and the rover receiver.

Therefore, the positioning that employs the carrier phase can be performed even in places, such as indoors, where a GPS signal cannot be received, or in places hidden from the satellite, such as those in mountains and forests and behind skyscrapers in cities, where the number of GPS signals required for positioning cannot be received. As a result, an accurate positioning having an error of only several mm to several cm can be performed.

Furthermore, the pseudolite transmits data transmitted from GPS satellites, and the stationary reference station, the moving reference station and the rover receiver have a function of a GPS receiver.

Therefore, versatile uses relative to a conventional positioning using a GPS are provided.

Furthermore, the pseudolite uses FDMA (Frequency Division Multiple Access) and retransmits data transmitted from all of a navigation satellite, a geostationary satellite, and a quasi-stationary satellite including a GPS satellite.

Furthermore, the pseudolite retransmits data transmitted from all of a navigation satellite, a geostationary satellite, and a quasi-stationary satellite including a GPS satellite by using spatial division of a satellite.

Therefore, it is possible to provide an RTK positioning system that employs not only the GPS satellites, but also all the navigation satellites, the stationary satellites and the quasi-stationary satellites.

Furthermore, at least one of the pseudolites is a GPS-like satellite.

Furthermore, at least one of the pseudolites is a fixed spread spectrum signal source.

Furthermore, at least one of the pseudolites is a stationary satellite or a quasi-stationary satellite.

Therefore, it is possible to provide an RTK positioning system that functions outdoors by employing the stationary satellite or the quasi-stationary satellite as a signal source.

Furthermore, the fixed spread spectrum signal source is a synchrolite.

Furthermore, the fixed spread spectrum signal source is a GPS signal re-transmitter.

Furthermore, the GPS signal re-transmitter transmits GPS-like signal.

Furthermore, the GPS signal re-transmitter transmits spread spectrum signal similar to GPS-like signal.

Furthermore, five pseudolites are used, and the pseudolite retransmits signals at two different frequency bands, and a position of the moving reference station is determined by on-the-fly.

Thus, since the initialization is automatically performed by the on-the-fly, the user can perform positioning in real time, which is very practical and convenient.

Furthermore, the moving reference station moves along a circle in which the stationary reference station is at a center of the circle.

Thus, since the unknown number of parameters is reduced, the process for obtaining the baseline is more simplified, and the load imposed on an analysis program can be reduced.

Furthermore, the user processor unit is a processor inside the rover receiver.

Therefore, the configuration of the RTK positioning system can be simplified.

Furthermore, the user processor unit is a computer connected to the rover receiver.

In the case that an analysis program is performed by the computer having a high computation capability, the analyzation period can be considerably decreased.

Furthermore, the data link is a wireless link.

Furthermore, the data link is a wired link.

Furthermore, at least two rover receivers are used, and one of the rover receivers, with which a function of a reference station is provided, is used as the moving reference station.

Thus, the number of the devices to be installed indoors can be reduced.

DETAILED DESCRIPTION OF THE PREFERRED EMBODIMENTS

Assume that the locations of a pseudolite and a stationary reference station are previously obtained, and that code and carrier phase of a signal transmitted from the pseudolite are measured by the stationary reference station, a moving reference station and a rover receiver held by a user. Data of the code and the carrier phase, which are measured by the stationary reference station, the moving reference station and the rover receiver, are transmitted to a user processing unit using a data link. The user processing unit determines a baseline between the stationary reference station and the moving reference station and a baseline between the moving reference station and the rover receiver, and employs the two baselines and the previously known location of the stationary reference station to determine the position of the rover receiver. Therefore, even in places, such as indoors, where a GPS signal cannot be received, or in places hidden from the satellite, such as those in mountains and forests or behind high buildings in cities, where the number of GPS signals required for positioning cannot be received, the positioning method employing the carrier phase can be used. As a result, accurate positioning having an error of only several mm to several cm can be performed, and versatile uses relative to the conventional positioning using the GPS are provided.

An embodiment of the invention will now be described in detail with reference to FIGS. 1 to 3.

Figure 1:
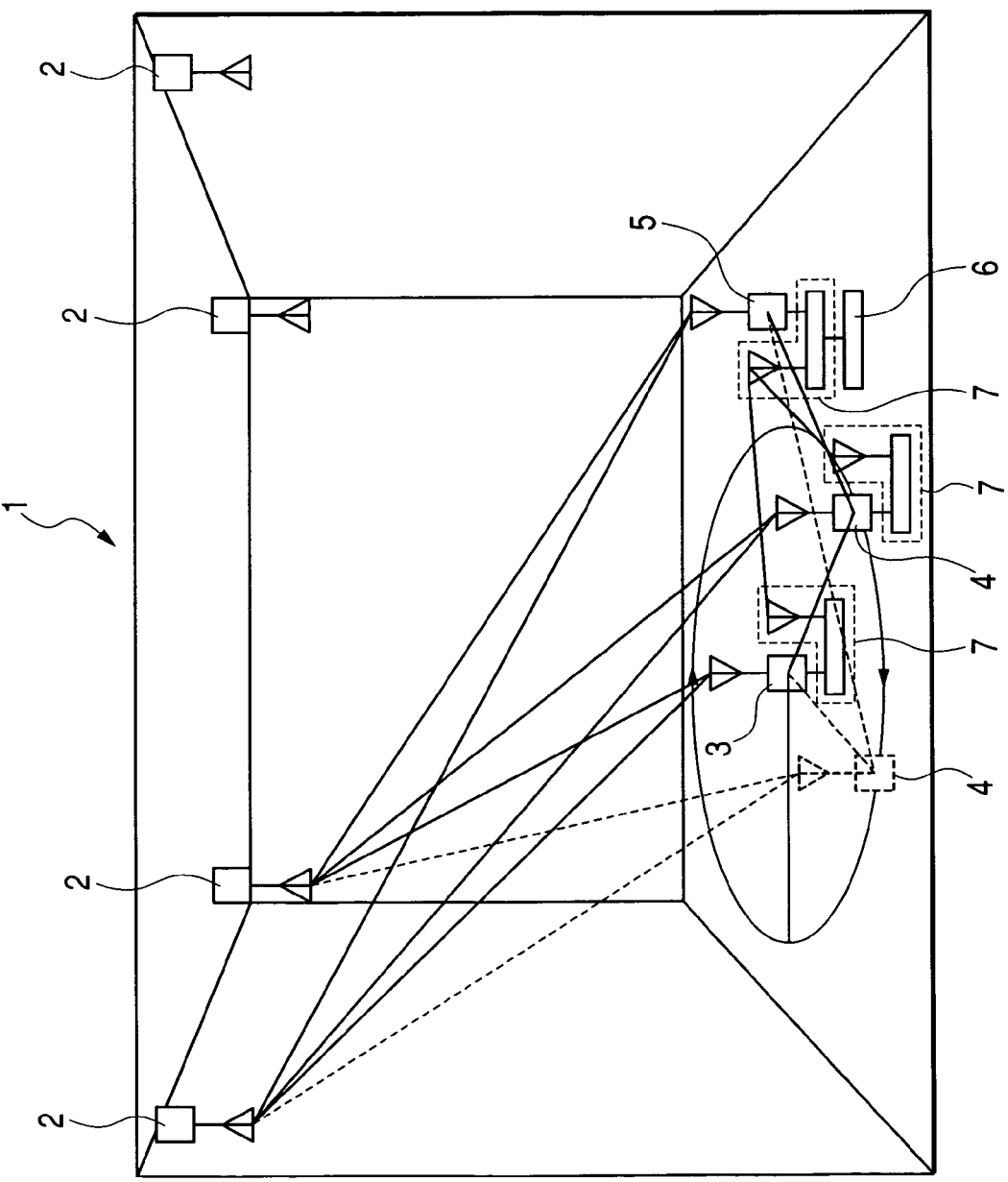
FIG. 1 is a diagram showing the configuration of the essential portion for one embodiment of the present invention.

FIG. 1 is a diagram showing the configuration of the essential portion of the embodiment of the invention. FIG. 2 is a flowchart showing an overview of a positioning method according to the invention. FIG. 3 is an enlarged diagram showing the essential portion that represents the positional relationship between a stationary reference station 3, a moving reference station 4 and a rover receiver 5, which will be described later. In the embodiment, an explanation will be given for a case wherein the positioning of the rover receiver 5 of a user is to be performed indoors where a GPS signal cannot be received.

Figure 3:
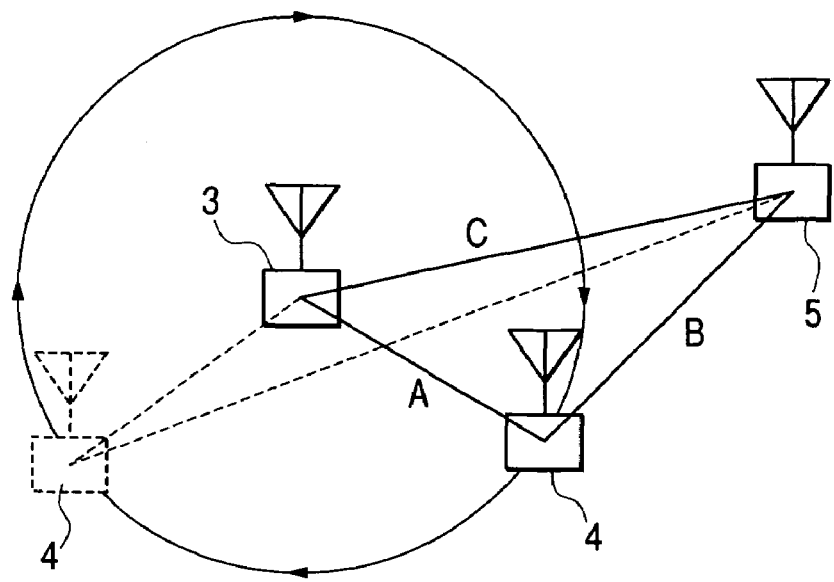
FIG. 3 is an enlarged diagram showing the essential portion representing the positional relationship between a stationary reference station, a moving reference station and a rover receiver in FIG. 1.

In FIGS. 1 and 3, an RTK (Real Time Kinematic) positioning system 1 employs an RTK positioning method to determine the position of the rover receiver 5 of a user. The RTK positioning system 1 has four pseudolites 2, two reference stations including the stationary reference station 3 and the moving reference station 4, the rover receiver 5, a user processing unit 6, and a data link 7.

The pseudolite 2 is employed as a signal source acting as a satellite. At least four pseudolites 2 are required for three-dimensional positioning, and at least three pseudolites 2 are required for two-dimensional positioning. In the embodiment, pseudolites available on the market are employed. GPS-like satellite or a fixed spread spectrum signal source may be employed instead of the pseudolite 2. The spread spectrum signal source can be a synchrolite, or a GPS signal re-transmitter for transmitting a GPS-like satellite signal or a similar spread spectrum signal. Since various signal sources can be employed, versatile uses of the RTK system can be provided.

The stationary reference station 3 is fixed and functions as a reference station. The moving reference station 4 moves constantly and functions as a second intermediate reference station. The rover receiver 5 is owned by a user. In the embodiment, the stationary reference station 3, the moving reference station 4 and the rover receiver 5 have a function of a GPS receiver, available on the market, that can also measure code and carrier phase of a GPS signal. The four pseudolites 2 should need to be set and registered with the reference stations 3 and 4 and the rover receiver 5 so that they can receive and measure signals from the pseudolites 2. The stationary reference station 3, the moving reference station 4 and the rover receiver 5 are not limited to the GPS receivers available on the market, and may be any receivers that can measure the code and the carrier phase of the signals transmitted from the pseudolites 2.

The user processing unit 6 uses data transmitted from the stationary reference station 3, the moving reference station 4 and the rover receiver 5 to execute a data processing algorithm in order to determine the position of the rover receiver 5. In the embodiment, a standard laptop computer is employed, and the data processing algorithm, which be described later, is installed as software. However, the data processing algorithm may be executed in the internal processor of the rover receiver 5.

The data link 7 is used for the exchange of data between the stationary reference station 3, the moving reference station 4, the rover receiver 5 and the user processing unit 6. Therefore, in the embodiment, a wireless communication means including a data transmitter and a data receiver which is attached or connected to the stationary reference station 3, the moving reference station 4 and the rover receiver 5. A wired communication means, such as cable, may be employed.

The operation of the RTK positioning system 1 will now be described in detail while reference to FIGS. 1 to 3.

Before the positioning, the four pseudolites 2 are respectively installed at four corners of a room. Each location of the pseudolites 2 are measured to be previously known by the user processor unit 6. The stationary reference station 3 and the moving reference station 4 are installed at arbitrary locations in the room. The location of the stationary reference station 3 is measured to be previously known by the user processor unit 6.

As shown in FIG. 1 and FIG. 3, a solid line indicates the location of the moving reference station 4 at the time of epoch k, and a broken line indicates the location of the moving reference station 4 at the time of epoch (k+1). That is, the moving reference station 4 is located to move along a circle whose radius is a predetermined value "R" and in which the stationary reference station 3 is at the center of the circle. The circle is on the same plane as the stationary reference station 3. However, so long as the moving reference station 4 is constantly moving, such a moving restriction is not required, and the moving reference station 4 may move at random.

However, the above positional relationship between the fixed reference station receiver 3 and the moving reference station receiver 4 is preferable. If the moving reference receiver 4 moves along the same plane as the stationary reference station 3, the parameter toward the height of the moving reference station 4 for positioning of the rover receiver 5 can be established. Further, if the moving reference station 4 moves along the circle, the distance between the stationary reference station 3 and the moving reference station 4 is established as a constant and predetermined value because the moving reference station 4 moves along a specific moving path. As a result, the number of unknown parameters used to analyze the baseline is further reduced. Therefore, analyzation of the baseline in order to determine the position of the rover receiver 5 is more simplified.

For the positioning, the initialization for the stationary reference station 3 and the moving reference station 4 is performed in advance. It is more practical if the initialization is automatically performed by on-the-fly which is a well known for a RTK positioning method. However, for the initialization, at least five pseudolites 2 are required, and the pseudolites 2 have to retransmit signals at two different frequency bands L1 and L2.

The on-the-fly is practical because it is available not only for the automatic initialization performed before the positioning is started, but also for an initialization that may be required due to the instantaneous cutting off or the halting of the reception of a signal from a satellite, which may occur during the positioning.

In the RTK positioning system 1, a user has the rover receiver 5, the user processing unit 6 and a part of the data link 7 (a portion attached or connected to the rover receiver 5). As the user moves, these units are moved around the room. The positioning of the rover receiver 5 starts to be performed when the user enters the room.

First, the codes and the carrier phase of the signals, transmitted from the four pseudolites 2 located in the room, are measured by the stationary reference station 3, the moving reference station 4 and the rover receiver 5.

Data of the codes and the carrier phase of the signals measured by the stationary reference station 3, the moving reference station 4 and the rover receiver 5 are transmitted to the user processing unit 6 using the data link 7.

Figure 2:
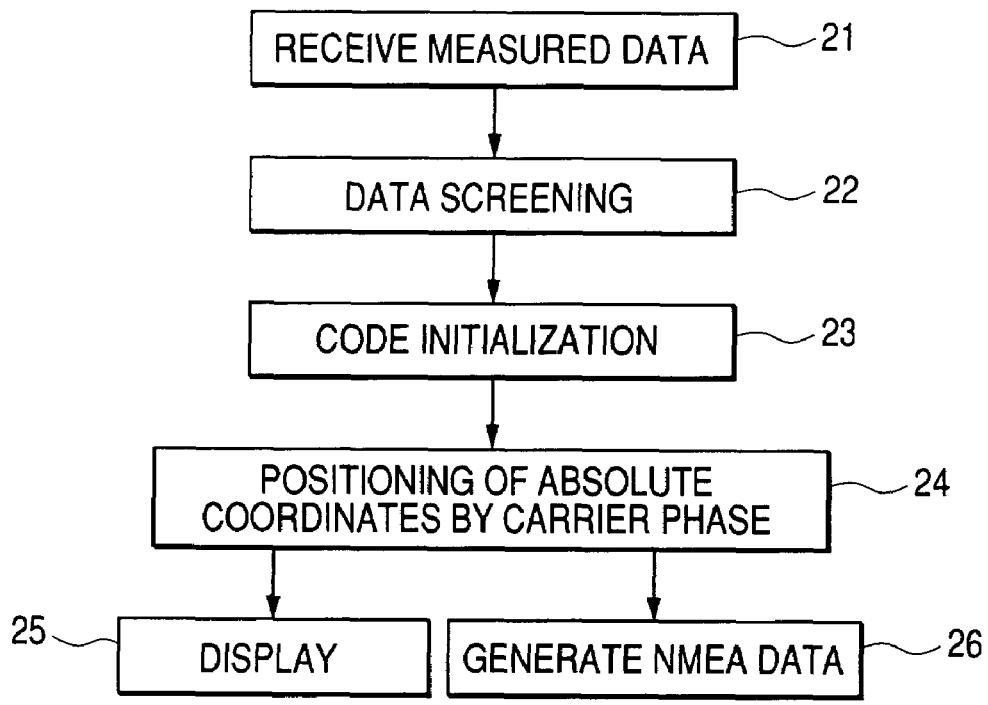
FIG. 2 is a flowchart showing an overview of a positioning method according to the invention.

The user processing unit 6 receives the measured data, through an interface, transmitted from the stationary reference station 3, the moving reference station 4 and the rover receiver 5 (step 21 in FIG. 2). Then, the user processing unit 6 executes the following steps under the data processing algorithm in order to determine the position of the rover receiver 5.

The user processing unit 6 performs screening of the measured data to extract necessary data from the measured data (step 22). Next, the user processing unit 6 initializes the codes (step 23) and determines the position of the rover receiver 5 by the carrier phase (step 24).

It is important for the positioning that the moving reference station 4 constantly moves. In the embodiment, instead of satellites, the pseudolites 2 installed at the established locations of the room are employed as signal sources for performing the RTK positioning. Therefore, since the pseudolites 2, acting as signal sources, are fixed, the geometry is not changed, and ambiguities cannot be determined. However, as the moving reference station 4 moves, the geometry changes between the moving reference station 4 and the stationary reference station 3, and between the moving reference station 4 and the rover receiver 5. Therefore, a baseline A between the stationary reference station 3 and the moving reference station 4, and a baseline B between the moving reference station 4 and the rover receiver 5 can be determined. A baseline C is a baseline between the stationary reference station 3 and the rover receiver 5.

Since the baselines A and B and the location of the stationary reference station 3 are previously known by the user processing unit 6, the positioning of the rover receiver 5 can be performed.

The user processing unit 6 displays the determined position of the rover receiver 5 (step 25). Further, the user processing unit 6 generates NMEA data, which are the standards for communication between a GPS receiver and a navigation device, with reference to the determined position of the rover receiver 5 (step 26).

As a reference, the basis for the data processing algorithm is described as follows.

First, the relative ambiguity between the rover receiver 5 and the stationary reference station 3 is represented by the following equation (1).

$$\begin{pmatrix} \|X\|_0 \\ \|N\|_{10} \end{pmatrix} = \begin{pmatrix} \|X\|_1 \\ \|0\| \end{pmatrix} + \begin{pmatrix} \|B\|_{12} \\ \|N\|_{12} \end{pmatrix} + \begin{pmatrix} \|B\|_{20} \\ \|N\|_{20} \end{pmatrix} \quad (1)$$

In the above equation (1), $\|X\|_0$: a vector for the coordinates of the rover receiver 5

$\|X\|_1$: a vector for the coordinates of the stationary reference station 3

$\|N\|_{10}$: a vector for the DD (double phase difference) ambiguity of the baseline C (the baseline between the rover receiver 5 and the stationary reference station 3)

$\|N\|_{12}$: a vector for the DD (double phase difference) ambiguity of the baseline A (the baseline between the stationary reference station 3 and the moving reference station 4)

$\|N\|_{20}$: a vector for the DD (double phase difference) ambiguity of the baseline B (the baseline between the moving reference station 4 and the rover receiver 5)

$\|B\|_{12}$: the baseline A (the baseline between the stationary reference station 3 and the moving reference station 4)

$\|B\|_{20}$: the baseline B (the baseline between the moving reference station 4 and the rover receiver 5)

The coordinate vector $\|X\|_1$ for the stationary reference station 3 is defined as having already been established (the baseline length mod ($\|B\|_{12}$) of the baseline A between the stationary reference station 3 and the moving reference station 4 may also have already been established).

The following equations (2) and (3) must be solved for $\|B\|_{20}$, $\|B\|_{12}$, $\|N\|_{20}$ and $\|N\|_{12}$.

$$\begin{pmatrix} \|\Delta\nabla P_{20}\|_{\{k\}} \\ \|\Delta\nabla C_{20}\|_{\{k\}} \end{pmatrix} = [\,|A_{20}|\,]_{\{k\}} \times \begin{pmatrix} \|B\|_{20\{k\}} \\ \|N\|_{20} \end{pmatrix} \quad (2)$$

$$\begin{pmatrix} \|\Delta\nabla P_{12}\|_{\{k\}} \\ \|\Delta\nabla C_{12}\|_{\{k\}} \end{pmatrix} = [\,|A_{12}|\,]_{\{k\}} \times \begin{pmatrix} \|B\|_{12\{k\}} \\ \|N\|_{12} \end{pmatrix} \quad (3)$$

In the equations (2) and (3), $P_{20}$: a DD (a double phase difference) for a pseudo distance (a pseudo distance between the moving reference station 4 and the rover receiver 5)

$P_{12}$: a DD (a double phase difference) for a pseudo distance (a pseudo distance between the stationary reference station 3 and the moving reference station 4)

$C_{20}$: a DD (a double phase difference) for carrier phase (carrier phase between the moving reference station 4 and the rover receiver 5)

$C_{12}$: a DD (a double phase difference) for carrier phase (carrier phase between the stationary reference station 3 and the moving reference station 4)

$[|A_{20}|]_{\{k\}}$: a design matrix (a design matrix between the moving reference station 4 and the rover receiver 5)

$[|A_{12}|]_{\{k\}}$: a design matrix (a design matrix between the stationary reference station 3 and the moving reference station 4)

The number of equations for each series is 2k(m−1), where m denotes the number of pseudolites, and k denotes the number of epochs. While one epoch is enough to resolve the equation concerning the four pseudolites, the obtained solution is limited, depending on the accuracy of the pseudo distance.

In order to resolve the ambiguity, the equation for a less accurate pseudo distance is removed from the configuration, and the equation for the carrier phase is employed only to define the initial area that can be analyzed.

The expressions from which the equation for the pseudo distance is removed are represented as the following equations (4) and (5).

$$\|\Delta\nabla C_{20}\|_{\{k\}} = [\,|F_{20}|\,]_{\{k\}} \times \begin{pmatrix} \|B\|_{20\{k\}} \\ \|N\|_{20} \end{pmatrix} \quad (4)$$

$$\|\Delta\nabla C_{12}\|_{\{k\}} = [\,|F_{12}|\,]_{\{k\}} \times \begin{pmatrix} \|B\|_{12\{k\}} \\ \|N\|_{12} \end{pmatrix} \quad (5)$$

The following equations (6) and (7), which represent the initial solution, are introduced from the equations (2) and (3).

$$\begin{pmatrix} \|B\|_{20\{0\}} \\ \|N\|_{20} \end{pmatrix}_0 \quad (6)$$

$$\begin{pmatrix} \|B\|_{12\{0\}} \\ \|N\|_{12} \end{pmatrix}_0 \quad (7)$$

The following equation (8) may be added to the series described above.

$$b_{12\{k\}X}{}^2 + b_{12\{k\}Y}{}^2 + b_{12\{k\}Z}{}^2 = R_{12} \quad (8)$$

In the above equation (8), it should be noted that, for the indoor positioning, vector $\|B\|_{12\{k\}}$ has only two components, X and Y.

The number of equations (the number of ranks in a matrix) in the equations (4) and (5) is (m−1)k where m denotes the number of pseudolites and k denotes the number of epochs.

Therefore, the total number N of the equations included in expression 8 is N=(2m−1)k.

An unknown number M, is M=5k+2m−2.

Therefore, when M≦N, the coordinates for this series and the ambiguity can be solved.

The number of pseudolites should be m≧4, and the number of epochs should be k≧3.

When it is assumed that a user does not move vertically, M=4k+2m−2 because the vector $\|B\|_{20\{k\}}$ also has only the components X and Y.

Therefore, when the minimum required number of pseudolites is reduced to m≧3, the number of epochs is k≧4, and when the number of pseudolites is m≧4, the number of epochs is k≧2.

The moving reference station 4 is employed for the embodiment. For comparison with the embodiment, another embodiment where the moving reference station 4 is not employed will now be explained. An equation that does not include the moving reference station 4 cannot be solved at all, regardless of how many pseudolites are provided. This is because the equation concerning the sequential epochs would represent linear dependence, and the number of ranks for the series does not increase. When the moving reference station 4 is employed, design matrix $[|F_{12}|]_{\{k\}}$ and $[|F_{20}|]_{\{k\}}$ are changed for each epoch, and the equation concerning the sequential epochs does not represent linear dependence.

Generally, a period required for the RTK positioning method is shorter than that for another positioning method, and one second to one minute is required for the normal positioning outdoors. According to the invention, since the signal sources are considerably closer to the individual receivers, the geometry is changed greatly as the moving reference station 4 moves, so that the ambiguity can be more rapidly determined.

In the embodiment, an explanation has been given for the example wherein a GPS signal is re-transmitted by the pseudolites indoors, where the GPS signal cannot be received and wherein the location of the rover receiver 5 of the user is calculated while the only signal sources are the pseudolites. However, the present invention is not limited to the embodiment, and the rover receiver 5 can even be calibrated outdoors, at a location whereat a signal cannot be received from a satellite, i.e., a so-called geographically hidden place.

Furthermore, according to the invention, GPS receivers available on the market can be employed as the stationary reference station 3, the moving reference station 4 and the rover receiver 5 to also receive signals from the pseudolites. Therefore, according to the invention, the positioning system and the positioning method therefor can be employed not only in places where a GPS signal cannot be received, but also outdoors where the number of signals required for positioning cannot be obtained from the satellite, and can calibrate the rover receiver 5 by employing the pseudolites instead of the satellite.

Instead of the pseudolites, the signal sources can be stationary satellites, such as the WAAS launched by the United States, the MSAS launched by Japan or the EGNOS launched by Europe, and quasi-stationary satellites, such as the QZSS launched by Japan.

Furthermore, a pseudolite employs FDMA (Frequency Division Multiple Access) and also uses an available system frequency. Therefore, a pseudolite can receive signals not only from the GPS satellites launched by the United States, but also from navigation satellites, such as the GLONASS launched by Russia and the GALILEO launched by Europe, stationary satellites such as the WAAS launched by the United States, the MSAS launched by Japan and the EGNOS launched by Europe, and quasi-stationary satellites such as the QZSS launched by Japan. Therefore, when a pseudolite receives these signals and re-transmits them, the positioning system and the positioning method of the invention can employ signals transmitted by all the navigation satellites, the stationary satellites and the quasi-stationary satellites.

Further, since a pseudolite employs the spatial division of a satellite, the pseudolite can employ the signals transmitted by the navigation satellites, such as the GLONASS launched by Russia and the GALILEO launched by Europe, the stationary satellites, such as the WAAS launched by the United States, the MSAS launched by Japan and the EGNOS launched by Europe, and the quasi-stationary satellites such as the QZSS launched by Japan. Therefore, when a pseudolite receives these signals and re-transmits them, the positioning system and the positioning method of the invention can employ signals transmitted by of the navigation satellites, the stationary satellites and the quasi-stationary satellites.

So long as two or more rover receivers 5 are installed when a moving reference station 4 is not provided, the function of the reference station is additionally provided to one of the rover receivers 5 in order to make this rover receiver 5 serve as a second intermediate reference station, i.e., the moving reference station 4.

What is claimed is:

1. An RTK (Real Time Kinematic) positioning system which determines positions with pseudolites substituting as GPS satellites, comprising:
    a plurality of pseudolites, each of which is located at a predetermined position;
    a rover receiver for measuring code and carrier phase of signals transmitted from each of the pseudolites;
    a stationary reference station located at a predetermined position and for measuring code and carrier phase of signals transmitted from each of the pseudolites;
    a moving reference station for measuring code and carrier phase of signals transmitted from each of the pseudolites, and for moving;
    a user processor unit for positioning the rover receiver based on code and carrier phase transmitted from the stationary reference station and the moving reference station respectively and code and carrier phase transmitted from the rover receiver; and
    a data link to transmit each data from the stationary reference station, the moving reference station and the rover receiver to the user processor unit,
    wherein a position of the stationary reference station and each position of the pseudolites are known by the user processor unit.

2. The RTK positioning system according to claim 1, wherein at least four pseudolites are used for three-dimensional positioning of the rover receiver, and
    at least three pseudolites are used for two-dimensional positioning of the rover receiver.

3. An RTK (Real Time Kinematic) positioning system which determines positions with a GPS satellite and a pseudolite, comprising:
    a GPS satellite;
    at least one pseudolite, each of which is located at a predetermined position;
    a rover receiver for measuring code and carrier phase of signals transmitted from each of the GPS satellite and the pseudolite;
    a stationary reference station located at a predetermined position and for measuring code and carrier phase of signals transmitted from each of the GPS satellite and the pseudolite;
    a moving reference station for measuring code and carrier phase of signals transmitted from each of the GPS satellite and the pseudolite, and for moving;
    a user processor unit for positioning the rover receiver based on code and carrier phase transmitted from the stationary reference station and the moving reference station respectively, and code and carrier phase transmitted from the rover receiver; and
    a data link to transmit each data from the stationary reference station, the moving reference station and the rover receiver to the user processor unit,
    wherein a position of the stationary reference station and positions of the pseudolite are known by the user processor unit.

4. The RTK positioning system according to claim 3,
    wherein at least four satellites including the GPS satellite and the pseudolite are used for three-dimensional positioning of the rover receiver, and
    at least three satellites including the GPS satellite and the pseudolite are used for two-dimensional positioning of the rover receiver.

5. The RTK positioning system according to claim 1 or 3, wherein the pseudolite transmits data transmitted from GPS satellites, and
    the stationary reference station, the moving reference station and the rover receiver have a function of a GPS receiver.

6. The RTK positioning system according to claim 1 or 3, wherein the pseudolite uses FDMA (Frequency Division Multiple Access) and retransmits data transmitted from all of a navigation satellite, a geostationary satellite, and a quasi-stationary satellite including a GPS satellite.

7. The RTK positioning system according to claim 1 or 3, wherein the pseudolite retransmits data transmitted from all of a navigation satellite, a geostationary satellite, and a quasi-stationary satellite including a GPS satellite by using spatial division of a satellite.

8. The RTK positioning system according to claim 1 or 3, wherein at least one of the pseudolites is a GPS-like satellite.

9. The RTK positioning system according to claim 1 or 3, wherein at least one of the pseudolites is a fixed spread spectrum signal source.

10. The RTK positioning system according to claim 1 or 3, wherein at least one of the pseudolites is a stationary satellite or a quasi-stationary satellite.

11. The RTK positioning system according to claim 9, wherein the fixed spread spectrum signal source is a synchrolite.

12. The RTK positioning system according to claim 9, wherein the fixed spread spectrum signal source is a GPS signal re-transmitter.

13. The RTK positioning system according to claim 12, wherein the GPS signal re-transmitter transmits GPS-like signal.

14. The RTK positioning system according to claim 12, wherein the GPS signal re-transmitter transmits spread spectrum signal similar to GPS-like signal.

15. The RTK positioning system according to claim 1 or 3, wherein five pseudolites are used, and the pseudolite retransmits signals at two different frequency bands, and
    a position of the moving reference station is determined by on-the-fly.

16. The RTK positioning system according to claim 1 or 3, wherein the moving reference station moves along a circle in which the stationary reference station in at a center of the circle.

17. The RTK positioning system according to claim 1 or 3, wherein the user processor unit is a processor inside the rover receiver.

18. The RTK positioning system according to claim 1 or 3, wherein the user processor unit is a computer connected to the rover receiver.

19. The RTK positioning system according to claim 1 or 3, wherein the data link is a wireless link.

20. The RTK positioning system according to claim 1 or 3, wherein the data link is a wired link.

21. The RTK positioning system according to claim 1 or 3, wherein at least two rover receivers are used, and one of the rover receivers, with which a function of a reference station is provided, is used as the moving reference station.

22. An RTK positioning method, comprising the steps of:
setting positions of pseudolites to be previously known by a user processor unit and setting a position of a stationary reference station to be known by the user processor unit;
measuring code and carrier phase of signals transmitted from the pseudolites by the stationary reference station, a moving reference station and a rover receiver held by a user, respectively;
transmitting code data and carrier phase data respectively measured in the stationary reference station, the moving reference station and the rover receiver to the user processor unit with a data link;
positioning the rover receiver based on code and carrier phase transmitted from the stationary reference station, the moving reference station and the rover receiver.

23. The RTK positioning method according to claim 22, wherein the signals are transmitted from the four pseudolites in three-dimensional positioning of the rover receiver, and the signals are transmitted from the three pseudolites in two-dimensional positioning of the rover receiver.

24. The RTK positioning method according to claim 22, wherein the pseudolite transmits data transmitted from GPS satellites, and the stationary reference station, the moving reference station and the rover receiver have a function of a GPS receiver.

25. The RTK positioning method according to claim 22, wherein the pseudolite uses FDMA (Frequency Division Multiple Access) and retransmits data transmitted from all of a navigation satellite, a geostationary satellite, and a quasi-stationary satellite including a GPS satellite.

26. The RTK positioning method according to claim 22, wherein the pseudolite retransmits data transmitted from all of a navigation satellite, a geostationary satellite, and a quasi-stationary satellite including a GPS satellite by using spatial division of a satellite.

27. The RTK positioning method according to claim 22, wherein at least one of the pseudolites is a GPS-like satellite.

28. The RTK positioning method according to claim 22, wherein at least one of the pseudolites is a fixed spread spectrum signal source.

29. The RTK positioning method according to claim 22, wherein at least one of the pseudolites is a stationary satellite or a quasi-stationary satellite.

30. The RTK positioning method according to claim 28, wherein the fixed spread spectrum signal source is a synchrolite.

31. The RTK positioning method according to claim 28, wherein the fixed spread spectrum signal source is a GPS signal re-transmitter.

32. The RTK positioning method according to claim 31, wherein the GPS signal re-transmitter transmits GPS-like signal.

33. The RTK positioning method according to claim 31, wherein the GPS signal re-transmitter transmits spread spectrum signal similar to GPS-like signal.

34. The RTK positioning method according to claim 22, wherein five pseudolites are used, and the pseudolite retransmits signals at two different frequency bands, and
a position of the moving reference station is determined by on-the-fly.

35. The RTK positioning method according to claim 22, wherein the moving reference station moves along a circle in which the stationary reference station is at a center of the circle.

36. The RTK positioning method according to claim 22, wherein the user processor unit is a processor inside the rover receiver.

37. The RTK positioning method according to claim 22, wherein the user processor unit is a computer connected to the rover receiver.

38. The RTK positioning method according to claim 22, wherein the data link is a wireless link.

39. The RTK positioning method according to claim 22, wherein the data link is a wired link.

40. The RTK positioning method according to claim 22, wherein at least two rover receivers are used, and one of the rover receivers, with which a function of a reference station is provided, is used as the moving reference station.

* * * * *